United States Patent [19]

Benditt et al.

[11] Patent Number: 4,719,275

[45] Date of Patent: Jan. 12, 1988

[54] HEAT STABLE FLUORINATED POLYORGANOSILOXANE COMPOSITIONS

[75] Inventors: Kathleen F. Benditt; Myron T. Maxson, both of Midland, Mich.

[73] Assignee: Dow Corning Corporation, Midland, Mich.

[21] Appl. No.: 881,303

[22] Filed: Jul. 2, 1986

[51] Int. Cl.$^4$ .............................................. C08G 77/06
[52] U.S. Cl. ........................................ 528/15; 528/31; 528/32; 525/478
[58] Field of Search .......................... 528/15, 31, 32; 525/478

[56] References Cited

U.S. PATENT DOCUMENTS

| | | | |
|---|---|---|---|
| 2,979,519 | 4/1961 | Pierce et al. | 260/448.2 |
| 3,020,260 | 2/1962 | Nelson | 260/46.5 |
| 3,046,293 | 7/1962 | Pike | 260/448.2 |
| 3,419,593 | 12/1968 | Willing | 528/15 |
| 3,715,334 | 2/1973 | Karstedt | 528/28 |
| 3,719,619 | 3/1973 | Nagata et al. | 260/22 CB |
| 4,032,502 | 6/1977 | Lee et al. | 528/15 |
| 4,041,010 | 8/1977 | Jeram | 528/15 |
| 4,072,635 | 2/1978 | Jeram | 260/2.5 S |
| 4,122,246 | 10/1978 | Sierawski | 260/46.5 |
| 4,374,967 | 2/1983 | Brown et al. | 528/15 |
| 4,585,848 | 4/1986 | Evans et al. | 528/15 |

Primary Examiner—Melvyn I. Marquis
Attorney, Agent, or Firm—Robert Spector

[57] ABSTRACT

Polyorganosiloxane gels exhibiting a resistance to discoloration and hardening at temperatures of 100° C. and above can be prepared by the reaction of a polydiorganosiloxane containing silicon-bonded fluorinated hydrocarbon radicals with an organohydrogensiloxane containing at least three silicon-bonded hydrogen atoms per molecule in the presence of a platinium containing catalyst. The resistance to heat induced hardening and discoloration is achieved by preparing the polydiorganosiloxane by the ammonia catalyzed polymerization of at least one cyclic fluorine-containing diorganosiloxane followed by reaction of the resultant silanol terminated polymer with a hexaorganodisilazane containing a vinyl radical bonded to each of the two silicon atoms.

The reactants preferably contain 3,3,3-trifluoropropyl radicals to achieve a resistance to softening and/or solubilization of the cured gel in the presence of hydrocarbon fuels.

8 Claims, No Drawings

HEAT STABLE FLUORINATED POLYORGANOSILOXANE COMPOSITIONS

BACKGROUND OF THE INVENTION

1. Field of the Invention

This invention relates to curable polyorganosiloxane compositions. More particularly, this invention relates to fluorinated polyorganosiloxane compositions that cure by a hydrosilation reaction to yield thermally stable gels exhibiting a resistance to solubilization in liquid hydrocarbons.

2. Description of the Prior Art

The term "polyorganosiloxane gel" typically defines a class of elastomeric, readily deformable materials exhibiting a surface hardness of below about 20 on the Shore 00 durometer scale. The hardness value of many gels is too low to be measured on this scale, and is often expressed as the depth to which a penetrometer probe of specified dimensions will penetrate or deflect the surface of the gel under a given loading.

U.S. Pat. No. 3,020,206, which issued to Nelson on Feb. 6, 1962, discloses organosiloxane gels that are reaction products of mixtures consisting essentially of an organosiloxane having repeating units of the formulae $RViSiO$, $R_2SiO$ and $CH_3R_2SiO_{0.5}$, and a liquid organohydrogensiloxane of the general formula $HRCH_3SiO(R_2SiO)_nSiCH_3RH$ where each R individually represents a methyl or phenyl radical, Vi represents vinyl, the value of n is such that the viscosity of the material does not exceed 0.1 m$^2$/sec. at 25° C., and at least 0.174 mole percent of the units in the organosiloxane are $RViSiO$. The mixture also includes a platinum catalyst and contains an average of from 1.4 to 1.8 gram atoms of silicon-bonded hydrogen per gram molecular weight of organosiloxane and at least one $RViSiO$ unit for each silicon-bonded hydrogen atom. In accordance with the teaching of Nelson, an organosiloxane containing vinyl radicals at non-terminal positions is reacted with an organohydrogensiloxane containing silicon-bonded hydrogen atoms only at the terminal positions.

U.S. Pat. No. 4,072,635, which issued to Jeram on Feb. 7, 1978 teaches preparing organosiloxane gels from reactants similar to those disclosed in the aforementioned Nelson patent, with the exception that vinyl radicals and silicon-bonded hydrogen atoms can be located at both terminal and non-terminal positions in the organosiloxane and organohydrogensiloxane, respectively.

U.S. Pat. No. 4,374,967, which issued to Brown, Lee and Maxson on Feb. 22, 1983, describes dielectric silicone gels capable of remaining in the amorphous, non-crystalline phase at extremely low temperatures in the order of −120° C. The gels are reaction products of (1) a polyorganosiloxane containing specified concentrations of monomethylsiloxy, dimethylsiloxy, trimethylsiloxy and dimethylvinylsiloxy units, (2) an organohydrogensiloxane and (3) a platinum catalyst.

The unique physical and chemical properties of polyorganosiloxane gels make them desirable as coatings and encapsulants for electrical and electronic devices to protect these devices from moisture, other contaminants and mechanical abuse, all of which can cause the device to malfunction or become inoperative.

Organosiloxane gels can also be used to coat or encapsulate printed circuit boards and other substrates on which are mounted electronic components such as solid state devices and integrated circuits. In some instances the circuit board is intended to be repairable by identifying and replacing defective component(s) rather than the entire circuit board. If the components and associated substrate on which the components are mounted were coated or encapsulated with a gel, the gel would have to be self-healing following removal of the probe of a voltmeter or other device used to identify the defective component(s). When this has been accomplished, a portion of the gel is cut away to permit replacement of the defective component, following which the new component is encapsulated with additional gel. To be useful in this application a gel must remain sufficiently clear to allow visual inspection of the components and soft enough to be cut away from the substrate to permit replacement of the defective component(s).

Electronic components associated with electronic ignition and emission control systems of automobiles and other vehicles powered by internal combustion engines are often located in the engine compartment of the vehicle where they are exposed to hydrocarbon fuels, lubricating fluids and temperatures of at least 100° C.

The introduction of fluorinated hydrocarbon radicals into a polyorganosiloxane to impart resistance to swelling and/or solubilization by the liquid hydrocarbons present in gasoline and other fuels is disclosed in U.S. Pat. No. 2,979,519, which issued to Pierce et al. on Apr. 11, 1961 and in U.S. Pat. No. 3,719,619, which issued to Brown on Apr. 20, 1965.

One class of polyorganosiloxane gels is prepared by reacting a liquid polydiorganosiloxane containing silicon-bonded vinyl or other ethylenically unsaturated hydrocarbon radicals at each of the two terminal positions with a liquid organohydrogensiloxane containing an average of more than two silicon-bonded hydrogen atoms per molecule in the presence of a platinum catalyst. To achieve the physical properties characteristic of a gel the molar ratio of silicon-bonded hydrogen atoms to vinyl or other ethylenically unsaturated hydrocarbon radical is typically between 0.5 and 1.0.

Vinyl terminated polydiorganosiloxanes are often prepared by the polymerization of cyclic diorganosiloxanes containing an average of three or four $R_2SiO$ units per molecule. In this formula each R individually represents a substituted or unsubstituted monovalent hydrocarbon radical that contains substantially no ethylenic unsaturation. The polymerization is conducted in the presence of a catalytic amount of an acidic or basic material. Suitable catalysts should be soluble in the reaction mixture and include acids such as sulfuric acid and the organosulfonic acids and basic materials such as the alkali metal hydroxides and alkali metal silanolates.

The production of hydroxyl terminated polydiorganosiloxanes containing from 2 to 250 or more repeating units per molecule by the reaction of cyclic diorganosiloxanes or linear polydiorganosiloxanes under superatmospheric pressure in the presence of ammonia as the catalyst is disclosed in U.S. Pat. No. 3,046,293, which issued to Pike on July 24, 1962.

If it is desired to prepare a diorganovinylsiloxy terminated polydiorganosiloxane using a relatively strong acid or base catalyst, a disiloxane of the general formula $(R'_2ViSi)_2O$ is included in the polymerization reaction mixture together with the cyclic diorganosiloxane. Alternatively the hydroxyl terminated polymer obtained from the polymerization of at least one cyclic diorganosiloxane is reacted with a hexaorganodisilazane of the general formula (R'$_2$ViSi)$_2$NH. In the foregoing formulae R' represents a hydrocarbon radical free of ethylenic unsaturation and Vi represents a vinyl radical.

Prior art references typically disclose but do not exemplify gels formed by a hydrosilation reaction between a vinyl-containing fluorinated polyorganosiloxane and an organohydrogensiloxane. The present inventors found that when conventional non-volatile acidic or basic catalysts of the prior art are used to prepare diorganovinylsiloxy terminated polydiorganosiloxanes wherein at least about 75 mole percent of the repeating units contain a fluorinated hydrocarbon radical such as 3,3,3-trifluoropropyl bonded to silicon, the gels prepared by reacting these polymers with an organohydrogensiloxane often discolor and harden during relatively short exposures to temperatures of 100° C. and above. Some gels discolor during curing.

U.S. Pat. No. 4,122,246, which issued to Sierawski on Oct. 24, 1978, teaches preventing the discoloration of gels during aging. The composition for preparing the gel contains (1) a polyorganosiloxane containing an average of about two vinyl radicals per molecule and an average of from 2 to 2.03 hydrocarbon or fluoroalkyl radicals per silicon atom; (2) an organosilicon compound having an average of at least 3 silicon-bonded hydrogen atoms per molecule; (3) a polysiloxane having at least one silicon-bonded hydroxyl radical per molecule, at least two silicon-bonded vinyl radicals per molecule, and an average of less than 15 silicon atoms per molecule; and (4) a silane having at least one silicon-bonded epoxy-substituted organo group, at least one silicon-bonded alkoxy group having less than 5 carbon atoms per group; and (5) a platinum catalyst. The combined weights of ingredients (3) and (4) are less than 1.5 weight percent of the composition and the molar ratio of silicon-bonded hydrogen atoms in (2) to vinyl radicals in (1) is less than 1. The gel obtained by curing the composition exhibits a penetration of from 2 to 60 millimeters measured using a Precision Universal Penetrometer. To achieve the desired resistance to discoloration ingredients (1), (3), and (4) must be combined before being blended with the remaining ingredients of the composition.

Following the teaching of Sierwaski to prepare a gel that is resistant to discoloration upon aging is less than desirable because of the two additional ingredients required, which increases the cost of the curable composition. In addition Sierwaski does not address the problem of hardening that has been observed when fluorinated polyorganosiloxane gels are heated at temperatures of 100° C. and above.

One objective of this invention is to provide fluorine containing polyorganosiloxane compositions that can be cured to yield gels exhibiting a resistance to discoloration and hardening when heated, and to do so without requiring reactants other than a vinyl containing polydiorganosilxane, an organohydrogensiloxane and a curing catalyst.

SUMMARY OF THE INVENTION

It has now been found that polyorganosiloxane gels exhibiting a resistance to discoloration and hardening at temperatures of 100° C. and above can be prepared by the reaction of a polydiorganosiloxane containing silicon-bonded fluorinated hydrocarbon radicals with an organohydrogensiloxane containing at least three silicon-bonded hydrogen atoms per molecule in the presence of a platinium containing catalyst. The resistance to heat induced hardening and discoloration is achieved by preparing the polydiorganosiloxane by the ammonia catalyzed polymerization of at least one cyclic fluorine-containing diorganosiloxane followed by reaction of the resultant silanol terminated polymer with a hexaorganodisilazane containing a vinyl radical bonded to each of the two silicon atoms.

In a preferred embodiment the reactants contain 3,3,3-trifluoropropyl radicals to achieve a resistance to softening and/or solubilization of the cured gel in the presence of hydrocarbon fuels.

DETAILED DESCRIPTION OF THE INVENTION

This invention provides an organosiloxane composition curable to a clear, thermally stable fluorosilicone gel, said composition comprising A. a liquid diorganovinylsiloxy terminated polydiorganosiloxane wherein at least 25 percent of the silicon atoms are bonded to a fluorine containing hydrocarbon radical of the formula RfCH$_2$CH$_2$-, where Rf represents a perfluorinated hydrocarbon radical containing from 1 to 10 carbon atoms, and said polydiorganosiloxane is prepared by the ammonia-catalyzed polymerization of at least one cyclic diorganosiloxane followed by reaction of the resultant liquid silanol terminated polydiorganosiloxane with at least a stoichiometric amount of a hexaorganodisilazane wherein a vinyl radical is bonded to each of the two silicon atoms;

B. a compatible liquid fluorine containing organohydrogensiloxane containing said RfCH$_2$CH$_2$- radical and an average of more than two silicon-bonded hydrogen atoms per molecule in an amount sufficient to provide a molar ratio of silicon-bonded hydrogen atoms to vinyl radicals in said composition of from 0.5 to about 1.0; and C. an amount sufficient to promote curing of said composition of a platinum-containing catalyst.

1. The Vinyl-Terminated Polydiorganosiloxane

The ingredient believed responsible for the heat induced discoloration and hardening exhibited by prior art fluorosilicone gels cured by a hydrosilation reaction is the vinyl terminated fluorine-containing polydiorganosiloxane. Data in accompanying examples indicate that the catalyst used to polymerize the cyclic diorganosiloxane(s) from which these polymers are prepared affects the thermal stability of gels prepared using the polymers. The reason for this is not fully understood, however the present inventors have discovered that heat stability of the gel is considerably improved when ammonia is used as the catalyst to polymerize the cyclic diorganosiloxane. No teaching in the prior art discloses or even suggests using ammonia in preference to the large number of other prior art polymerization catalysts to avoid heat induced discoloration of fluorosilicone gels.

Ammonia is a relatively weak catalyst when compared to mineral acids, organosulfonic acids and basic compounds such as potassium hydroxide and the alkali metal silanolates. The reactant used to convert the resultant silanol terminated polydiorganosiloxane to a vinyl terminated polymer should therefore be capable of reacting in the presence of relatively weak catalysts. Hexaoganodisilazanes wherein each of the two silicon atoms is bonded to a vinyl radical will react under these conditions and are therefore the reactants of choice for preparing the vinyl terminated fluorinated polydiorganosiloxanes referred to hereinafter as ingredient A.

Methods for polymerizing cyclic diorganosiloxanes to liquid silanol terminated polydiorganosiloxanes using a variety of catalysts are sufficiently well described in the literature that a detailed description in this specification is not necessary. When ammonia is used as the catalyst, the polymerization reaction of the cyclic diorganosiloxane is typically conducted at temperatures of from 25 to about 100° C. and under superatmospheric pressure until the desired molecular weight is achieved.

Ingredient A can be either a homopolymer or a copolymer and is represented by the general formula

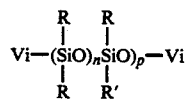

where R represents a monovalent hydrocarbon radical, R' represents the radical $RfCH_2CH_2-$ where Rf represents a monovalent perfluorinated hydrocarbon radical containing from 1 to about 10 carbon atoms, Vi represents a vinyl radical, the sum of n and p typically represents a molecular weight equivalent to a viscosity of from $0.2 \times 10^{-3}$ to $0.01$ m.$^2$/sec. at 25° C. and the value of n can be from 0 to 3p.

The radical represented by R can contain from 1 to about 20 carbon atoms and includes aklyl, cycloalkyl and aromatic radicals. Alkyl radicals containing from 1 to 4 carbon atoms and phenyl are preferred based on the availability of the corresponding cyclic diorganosiloxanes used to prepare ingredient A. Preferably R is methyl, phenyl or a combination of methyl and phenyl, R' is 3,3,3-trifluoropropyl and the value of n is 0.

Ingredient A is represented in the foregoing formula as a linear molecule. It will be understood, however, that in actuality some of the molecules may contain branched units resulting from small amounts of trifunctional reactants present as impurities in the cyclic diorganosiloxanes used to prepare ingredient A.

Ingredient A can be a single polydiorganosiloxane species or a mixture containing two or more polydiorganosiloxanes of different molecular weights, so long as the viscosity of the mixture is within the aforementioned limits.

2. The Curing Agent (Ingredient B)

The polydiorganosiloxane component (ingredient A) is cured by a hydrosilation reaction between the vinyl radicals of this ingredient and the silicon-bonded hydrogen atoms of the organohydrogensiloxane, referred to hereinafter as ingredient B. Ingredient B contains an average of more than two silicon-bonded hydrogen atoms per molecule. It can contain an average of from 3 up to 20 or more silicon atoms per molecule and exhibits a viscosity of up to 10 Pa.s or higher at 25° C.

Ingredient B can contain repeating units of the formulae $HSiO_{1.5}$, $R''HSiO$ and/or $R''_2HSiO_{0.5}$. The molecules of ingredient B can also include one or more monoorganosiloxane, diorganosiloxane, triorganosiloxy and/or $SiO_2$ units that do not contain silicon-bonded hydrogen atoms. In these formulae R'' is a monovalent hydrocarbon radical containing from 1 to about 20 carbon atoms or a fluorinated hydrocarbon radical selected from the same group as the R' radical of ingredient A. Alternatively, ingredient B can be a cyclic compound containing diorganosiloxane and organohydrogensiloxane units or a compound of the formula $Si(OSiR''_2H)_4$.

To ensure compatibility between ingredients A and B, at least a portion of the radicals represented by R'' should be identical to the majority of the hydrocarbon radicals present in ingredient A. When ingredient A is the preferred polydiorganosiloxane containing methyl-3,3,3-trifluoropropylsiloxane units, at least a portion of the R'' radicals should represent 3,3,3-trifluoropropyl radicals. Most preferably ingredient B is a linear dimethylhydrogensiloxy terminated polyorganosiloxane containing from one to about three repeating units per molecule, all of which correspond to the general formula

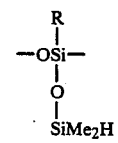

where R' represents 3,3,3-trifluoropropyl and Me represents methyl.

The molecular weights of ingredients A and B together with the number and distribution of the silicon-bonded hydrogen atoms in ingredient B will determine the location of crosslinks in the cured gel. The concentration of crosslinks per unit area is often referred to as the "crosslink density" and determines certain physical properties of the cured gel, particularly hardness and resiliency. The particular types and amounts of ingredients A and B yielding a desired combination of physical properties can readily be determined by routine experimentation with a knowledge of this invention.

The molar ratio of silicon-bonded hydrogen atoms to vinyl or other ethylenically unsaturated hydrocarbon radicals present in the curable compositions of this invention is a major factor in determining the properties of the cured gel. As disclosed hereinbefore, a preferred type of organosiloxane gel is prepared from curable compositions containing a stoichiometric excess of vinyl radicals relative to silicon-bonded hydrogen atoms. In the present compositions the number of silicon-bonded hydrogen atoms per vinyl radical is typically from 0.5 to 1. The preferred ratio for a given composition will be determined at least in part by the average molecular weight of ingredient A and the type of organohydrogensiloxane curing agent.

3. The Platinum Containing Catalyst and Optional Inhibitor

Hydrosilation reactions are typically conducted in the presence of a catalyst that is a platinum group metal or a compound of such a metal. Platinum compounds such as hexachloroplatinic acid, and particularly complexes of these compounds with relatively low molecular weight, liquid vinylcontaining organosiloxane compounds, are preferred catalysts because of their high activity and compatability with the organosiloxane reactants. These complexes are described in U.S. Pat. No. 3,419,593 that issued to David N. Willing on Dec. 31, 1968. Complexes wherein the silicon-bonded hydrocarbon radicals are vinyl and either methyl or 3,3,3-trifluoropropyl are particularly preferred because of their ability to catalyze a rapid curing of the elastomer at temperatures of at least about 70° C. A particularly preferred catalyst of this type is the complex formed by reacting hexachloroplatinic acid with a liquid dimethylvinylsiloxy terminated poly(methyl-3,3,3-trifluoropropyl)siloxane.

The platinum-containing catalyst can be present in an amount equivalent to as little as one part by weight of platinum per one million parts of curable composition. Catalyst concentrations equivalent to from 3 to 10 parts of platinum per million of curable composition are preferred to achieve a practical curing rate. Higher concentrations of platinum provide only marginal improvements in curing rate, and are therefore economically unattractive, particularly when the preferred catalysts are used.

Mixtures containing all of the foregoing reactants may begin to cure at room temperatures of about 25° C. To obtain a longer working time or "pot life" once all of the ingredients have been blended, the activity of the catalyst at room temperature can be retarded or suppressed by the addition of one of the known platinum catalyst inhibitors.

One class of inhibitors includes the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of the catalyst at 25° C. Compositions containing these catalysts typically require heating at temperatures of 70° C. or above to cure at a practical rate.

An increase in the pot life of a curable composition can also be achieved using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation. To maximize the resistance of the present compositions against heat induced discoloration and hardening, the concentrations of inhibitor and platinum catalyst should be as low as possible, consistent with a reasonably rapid cure rate.

4. Preparation of the Curable Compositions

The curable compositions of this invention can be prepared by blending together all of the ingredients at room temperature. Compositions containing one of the aforementioned platinum catalyst inhibitors can be stored at conventional room temperatures of about 25° C. for a few hours, or in some cases days, without curing to any substantial extent. When it is desired to store the curable composition for longer periods it should be packaged in two parts.

Part I of a two part composition will typically include a portion of the total amount of ingredient A, the liquid polydiorganosiloxane and the platinum-containing catalyst.

Part II contains the remaining portion of ingredient A, the organohydrogensiloxane (ingredient B) and any catalyst inhibitor.

Parts I and II each typically exhibit viscosities of from $0.5 \times 10^{-3}$ to $2.0 \times 10^{-3}$ m$^2$/sec. at 25° C.

Preferably a curable composition is prepared by blending together substantially equal volumes of parts I and II.

Irrespective of the method by which the present compositions are prepared, they are cured by allowing all of the ingredients to react at ambient or elevated temperature. Compositions containing a catalyst inhibitor typically require heating to temperatures of 70° C. or above to achieve a fully cured state within a reasonable time interval, usually from several minutes to an hour.

The fluorine containing polysiloxane gels prepared by curing the present compositions are relatively soft, clear and colorless, and remain so following prolonged exposure to temperatures from 100 to about 150° C. The hardness of the gels can be expressed as a penetration value, which is the distance to which a probe of specified dimensions will penetrate or deflect the surface of the gel under a specified loading. A penetrometer is often used to measure this value. A preferred class of cured gels prepared using the present compositions exhibit penetration values of from 2 to about 8 mm.

As discussed hereinabove the present gels are particularly suitable for coating or encapsulating solid state electronic devices and substrates on which these devices are mounted. Because the gels will not harden or discolor at temperatures of 100° C. and above and are not swollen and/or dissolved by hydrocarbon fuels, devices coated with the present gels can be installed in the engine compartments of automobiles and other vehicles.

The following examples describe a preferred curable composition of this invention and demonstrate the resistance to hardening and discoloration exhibited by the cured gel relative to gels prepared using polydiorganosiloxanes obtained by the polymerization of 2,4,6-trimethyl-2,4,6-tris(trifluoropropyl)cyclotrisiloxane in the presence of conventional acid and base polymerization catalysts. The examples should not be interpreted as limiting the scope of the invention defined in the accompanying claims. All parts and percentages disclosed in the examples are by weight unless otherwise indicated.

EXAMPLE 1

This example describes a curable composition of this invention wherein the polydiorganosiloxane was prepared using ammonia as the polymerization catalyst.

A curable composition was prepared by blending the following ingredients to homogeniety.

As ingredient A, 193 parts of a dimethylvinylsiloxy terminated poly(methyl-3,3,3-trifluoropropyl)siloxane containing 1.05% of vinyl radicals and exhibiting a viscosity of $1.4 \times 10^{-3}$ m$^2$/sec. Ingredient A had been prepared by the ammonia catalyzed polymerization of 2,4,6-trimethyl-2,4,6-tris(3,3,3-trifluoropropyl)cyclotrisiloxane. The polymerization was catalyzed by ammonia, and was conducted in a sealed reactor under a pressure of 207 kPa and at a temperature of 50° C. for 4 hours. The resultant silanol terminated polydiorganosiloxane was reacted with sym-tetramethyldivinyldisilazane.

As ingredient B, 6.5 parts of an organohydrogensiloxane curing agent represented by the average formula

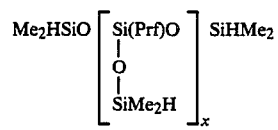

where Me represents a methyl radical, Prf represents a 3,3,3-trifluoropropyl radical, the average value of x is between 1 and 3, inclusive, and the silicon-bonded hydrogen content is 0.67%.

As ingredient C, 0.15 part of a complex prepared by the reaction of hexachloroplatinic acid with a liquid dimethylvinylsiloxy terminated poly(methyl-3,3,3-trifluoropropyl)siloxane; and as a catalyst inhibitor, 0.13 part of 2-methyl-3-butyn-2-ol. Ingredient C contained 0.67% platinum.

The molar ratio of silicon-bonded hydrogen atoms to vinyl radicals in the composition was 0.58.

A 50 gram portion of the resultant mixture was deaired under reduced pressure, poured into a wide mouth container and cured by heating it for one hour at 150° C. The cured gel layer was 2 cm. thick.

The penetration value of the gel was measured using a penetrometer manufactured by the Precision Scientific Company, catalog No. 73,510. The standard cones supplied with the instrument were replaced with a brass head measuring 6.350 mm. in diameter, 4.762 mm. in height and having a flat bottom and rounded edges. The total weight of the shaft and head was 19.5 grams.

The penetration value of the cured gel was 3.7 mm. The gel sample was then heated in an oven for 7 days at a temperature of 125° C. At the end of this period the penetration value of the gel was substantially unchanged (3.5mm), and the gel was clear and colorless.

EXAMPLE 2 (COMPARISON EXAMPLE)

This example demonstrates the poor heat stability of a fluorinated polyorganosiloxane gel prepared using a polydiorganosiloxane obtained using trifluoromethanesulfonic acid as the polymerization catalyst.

A curable composition was prepared using ingredients A', B, C and a platinum catalyst inhibitor. Ingredients B, C, and the inhibitor are described in the preceding example 1. Ingredient A', a dimethylvinylsiloxy terminated poly(methyl-3,3,3-trifluoropropyl) siloxane, is outside the scope of this invention.

Ingredient A' was prepared by the polymerization of 2,4,6-trimethyl-2,4,6-tris(3,3,3-trifluoropropyl)cyclotrisiloxane in the presence of a catalytic amount of trifluoromethanesulfonic acid, followed by reaction of the resultant silanol terminated polydiorganosiloxane with symtetramethyldivinyldisiloxane. The polymer exhibited a viscosity of $5.5 \times 10^{-4}$ m²/sec.

192 parts of ingredient A', 7.5 parts of ingredient B, 0.15 part of ingredient C and 0.13 part of 2-methyl-3-butyn-2-ol were blended to homogeniety, deaired and cured as described in the preceding Example 1. The molar ratio of silicon-bonded hydrogen atoms to vinyl radicals in the curable composition was 0.65.

The cured gel was light amber in color whereas the initial curable composition was colorless. The penetration value of the cured gel was 8.3 mm, measured as described in the preceding Example 1. After heating the gel in an oven for seven days at a temperature of 125° C. it became darker in color and the penetration value decreased to 0.9 mm., indicating that the gel hardened considerably during this period.

EXAMPLE 3 (COMPARISON EXAMPLE)

This example demonstrates the poor heat stability of a fluorinated polyorganosiloxane gel prepared using a polydiorganosiloxane obtained using lithium silanolate as the polymerization catalyst.

A curable composition was prepared using ingredients B, C and the inhibitor described in the preceding Example 1. Ingredient A", a dimethylvinylsiloxy terminated poly(methyl-3,3,3-trifluoropropyl)siloxane, is outside the scope of this invention. Ingredient A" was prepared by the polymerization of 2,4,6-trimethyl-2,4,6-tris(3,3,3-trifluoropropyl)cyclotrisiloxane in the presence of a catalytic amount of lithium silanolate (1 mole of lithium per 5000 moles of silicon), followed by reaction of the resultant silanol terminated polydiorganosiloxane with dimethylvinylsilanol. The final polymer exhibited a viscosity of $2.4 \times 10^{-3}$ m²/sec at 25° C.

97.39 parts of ingredient A", 2.39 parts of ingredient B, 0.2 part of ingredient C and 0.02 part of 2-methyl-3-butyn-2- ol were blended to homogeniety, deaired and cured as described in the preceding Example 1. The penetration value of the cured gel was 5.0 mm, and was measured as described in the preceding Example 1. A hard skin formed after heating the cured gel in an oven for 24 hours at a temperature of 125° C.

That which is claimed is:

1. An organosiloxane composition curable to a clear, thermally stable fluorosilicone gel, said composition comprising
   A. a liquid diorganovinylsiloxy terminated polydiorganosiloxane wherein at least 25 percent of the silicon atoms are bonded to a fluorine containing hydrocarbon radical of the formula RfCH₂CH₂—, where Rf represents a perfluorinated hydrocarbon radical containing from 1 to 10 carbon atoms, and said polydiorganosiloxane is prepared by the ammonia-catalyzed polymerization of at least one cyclic diorganosiloxane followed by reaction of the resultant liquid silanol terminated polydiorganosiloxane with at least a stoichiometric amount of a hexaorganodisilazane wherein a vinyl radical is bonded to each of the two silicon atoms;
   B. a compatible liquid fluorine containing organohydrogensiloxane containing said RfCH₂CH₂—radical and an average of more than two silicon-bonded hydrogen atoms per molecule in an amount sufficient to provide a molar ratio of silicon-bonded hydrogen atoms to vinyl radicals in said composition of from 0.5 to about 1.0; and
   C. an amount sufficient to promote curing of said composition of a platinum-containing catalyst.

2. A composition according to claim 1 where said polydiorganosiloxane exhibits the general formula

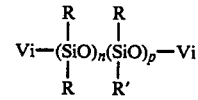

where R represents a monovalent hydrocarbon radical, R' represents said RfCH₂CH₂—radical, Vi represents a vinyl radical, the sum of n and p is equivalent to a molecular weight equivalent to a viscosity of from $0.2 \times 10^{-3}$ to 0.01 m.²/sec. at 25° C., and the value of n is from 0 to 3p.

3. A composition according to claim 2 where R contains from 1 to 10 carbon atoms and the value of n is from 0 to p.

4. A composition according to claim 3 where R is methyl or phenyl, Rf is 3,3,3-trifluoropropyl, n is 0 and the platinum-containing catalyst is the reaction product of hexachloroplatinic acid and a liquid diorganovinylsiloxy terminated poly(methyl-3,3,3-trifluoropropyl)-siloxane.

5. A composition according to claim 4 where R is methyl, the said hexaorganodisilazane is symtetramethyldivinyldisilazane, the organohydrogensiloxane is represented by the average formula

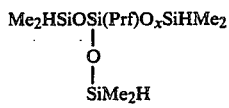

where Me represents methyl, Prf represents 3,3,3trifluoropropyl, the average value of x is from 1 to 3, inclusive, and the molar ratio of silicon-bonded hydrogen atoms to vinyl radicals in said compositions is from 0.5 to 1.0, inclusive.

6. A composition according to claim 5 where said cyclic diorganosiloxane is 2,4,6-trimethyl-2,4,6-tris(3,3,3-trifluoropropyl)cyclotrisiloxane.

7. A composition according to claim 6 where said composition includes a platinum catalyst inhibitor in an amount sufficient to prevent curing of said composition at temperatures of about 25° C.

8. A composition according to claim 7 where said composition is in two parts, the first of said parts consisting essentially of a portion of said polydiorganosiloxane and said platinum-containing catalyst and the second of said parts consisting essentially of the remaining portion of said polydiorganosiloxane, said organohydrogensiloxane, and said platinum catalyst inhibitor.

* * * * *